(12) United States Patent
Chebolu et al.

(10) Patent No.: US 10,135,886 B2
(45) Date of Patent: Nov. 20, 2018

(54) METHOD AND DEVICE FOR RETAINING ROBUST HEADER COMPRESSION (ROHC) COMPRESSOR STATE

(71) Applicant: Samsung Electronics Co., Ltd., Gyeonggi-do (KR)

(72) Inventors: Praveen Chebolu, Bangalore (IN); Ganesh Babu Kamma, Bangalore (IN); Varun Bharadwaj Santhebenur Vasudevamurthy, Bangalore (IN); Shaik Abdulla, Bangalore (IN); Ajay Kumar Kabadi, Bangalore (IN); Srinivas Chinthalapudi, Bangalore (IN); Harsh Maheshchand Kothari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 14/643,880

(22) Filed: Mar. 10, 2015

(65) Prior Publication Data
US 2015/0257037 A1    Sep. 10, 2015

(30) Foreign Application Priority Data
Mar. 10, 2014 (IN) ............................ 1235/CHE/2014

(51) Int. Cl.
*H04L 29/06* (2006.01)
(52) U.S. Cl.
CPC ...... *H04L 65/1089* (2013.01); *H04L 65/1069* (2013.01); *H04L 65/602* (2013.01); *H04L 65/608* (2013.01); *H04L 65/80* (2013.01); *H04L 69/04* (2013.01)

(58) Field of Classification Search
CPC .................................................... H04W 28/06
See application file for complete search history.

(56) References Cited

U.S. PATENT DOCUMENTS

| | | | |
|---|---|---|---|
| 2007/0058679 A1* | 3/2007 | Pelletier | H04W 28/06 370/477 |
| 2012/0075406 A1* | 3/2012 | Hultkrantz | H04Q 11/0457 348/14.01 |
| 2012/0113993 A1* | 5/2012 | Sridhar | H04L 65/604 370/474 |
| 2013/0120519 A1* | 5/2013 | Jin | H04W 36/0022 348/14.02 |
| 2014/0018053 A1* | 1/2014 | Cho | G06F 3/0488 455/418 |

* cited by examiner

*Primary Examiner* — Sulaiman Nooristany

(57) ABSTRACT

A method for retaining a Robust Header Compression (ROHC) state in a User Equipment (UE) during switching from a Voice over Long Term Evolution (VoLTE) call to a video call or vice versa is provided. When the VoLTE call is in progress and if a user switches the VoLTE call to the video call, then the RTP header information is sent to an Application Processor (AP) from a Communication Processor (CP). The ROHC compressor continues the compression of the RTP packets using the existing built context for the video call. Further, when the video call is in progress and if the user switches the video call to the VoLTE call, then the RTP header information is sent to the CP from the AP. The ROHC context is reused by exchanging the RTP header information between the AP and the CP.

18 Claims, 8 Drawing Sheets

METHOD AND DEVICE FOR RETAINING ROBUST HEADER COMPRESSION (ROHC) COMPRESSOR STATE

CROSS-REFERENCE TO RELATED APPLICATION AND CLAIM OF PRIORITY

The present application is related to and claims the priority under 35.U.S.C § 119(a) to Indian Application Serial No. 1235/CHE/2014, which was filed in the Indian Intellectual Property Office on Mar. 10, 2014, the entire contents of which are incorporated herein reference.

TECHNICAL FIELD

The present disclosure relates to wireless communication systems and more particularly relates to a method for retaining a Robust Header compression (ROHC) compressor state in a User Equipment (UE) during switching from a Voice over Long Term Evolution (VoLTE) call to a video call or vice versa.

BACKGROUND

Voice over Long Term Evolution (VoLTE) is emerging as a preferred solution for the need to support real time voice traffic in Internet Protocol (IP) networks. The move towards all-IP and Voice over Internet Protocol (VoIP) in wireless access networks (such as LTE, and the like) will dramatically increase overhead due to headers. For example, the VoIP is carried by the Real-time Transport Protocol/User Datagram Protocol/Internet Protocol (RTP/UDP/IP) suite. Assuming a cellular codec encoding rate of 12.2 kbps (kilobits per second), there is a payload (voice packets) of 34 bytes and a header overhead of 40 bytes for RTP/UDP/IPv4 (in case of IP version four). This is an enormous overhead, and is clearly an unacceptable use of precious wireless bandwidth. This is especially true because, for the VOIP, each User Equipment (UE) sends one RTP/UDP/IP frame every 20 ms (milliseconds). Further, these header fields do not change throughout the packet stream. Hence, these RTP/UDP/IP headers are compressed using a Robust Header Compression (ROHC) scheme, which is enabled by a network operator during the VoLTE call for compression of the header fields, which otherwise leads to enormous overhead.

During a VoLTE call, the network operator enables the ROHC scheme on all the voice packets sent by the UE. When the VoLTE call is established, a ROHC compressor in the UE starts compression in an Initial and Refresh (IR) state. In this state, the ROHC compressor sends complete IP/UDP/RTP header fields along with ROHC header in an IR ROHC packet. The ROHC compressor moves to further states after sending 'n' number of IR ROHC packets in the IR state for establishing a context with a ROHC decompressor, which is present at the receiver side in the UE. When the ROHC compressor moves to next state, such as either Full Context (FC) or Static Context (SC), the ROHC compressor sends packets other than the IR ROHC packet. In certain embodiments, the ROHC compressed packet is of 2-10 bytes range. As the VoLTE call progresses, the ROHC compressor works effectively in compressing the packets to a minimum of 4 bytes and sends those compressed packets to the ROHC decompressor.

In the existing system, when the VoLTE call is in progress and if the user switches the VoLTE call to a video call, the audio path switches to an Application Processor (AP) from a Communication Processor (CP), which is handling the VoLTE call. When the audio path is switched to the AP, there is no synchronization between an audio application in AP and the CP, all the RTP header fields are reset to new values. In certain embodiments, the AP generates new RTP Synchronization Source (RTP SSRC) and RTP Sequence Number (SN)/Time Stamp (TS) are also restarted from the beginning Hence, all the RTP header fields are new, when the call context is switched between AP and CP. When the RTP header fields are new, both dynamic & static fields, the ROHC compressor has to move back to IR state to update both dynamic and static header fields in its compressor context.

Further, when the ROHC compressor moves to IR state during call switch (from VoLTE call to the video call), this results in degrade of ROHC efficiency (as ROHC has to update its context and switches back to the IR state), which further leads to degrade in ROHC compression rate (rate at which ROHC is compressing the IP/UDP/RTP headers).

In certain embodiments, when the video call is in progress and if the user switches the video call to VoLTE call, the audio path switches to the CP from the AP, which is handling the video call. When the audio path is switched to the CP, there is no synchronization between the audio application in the AP and the CP, all the RTP header fields are reset to new values. In certain embodiments, the CP generates new SSRC (RTP SSRC) and RTP SN/TS are also restarted from the beginning Hence, all the RTP header fields are new when the call context is switched between the AP and the CP. When the RTP header fields are changed, both dynamic & static fields, the ROHC compressor has to move back to IR state to update both dynamic and static header fields in its compressor context.

Further, when the ROHC compressor moves to the IR state during call switch, from the video call to the VoLTE call, this degrades ROHC efficiency (as ROHC has to update its context and switches back to the IR state), which further leads to degrade in the ROHC compression rate (the rate at which ROHC is compressing the IP/UDP/RTP headers).

SUMMARY

To address the above-discussed deficiencies, it is a primary object to provide a method for retaining a Robust Header Compression (ROHC) compressor state during switching from a Voice over Long Term Evolution (VoLTE) call to a video call in a User Equipment (UE).

Another objective of the disclosure is to provide a method for sharing Real-time Transport Protocol (RTP) header information between an Application Processor (AP) and a Communication Processor (CP) in the UE during switching from the VoLTE call to the video call or vice versa.

Another objective of the disclosure is to provide a method for retaining the ROHC compressor state during switching from the video call to the VoLTE call in the UE.

Accordingly the disclosure provides a method for retaining a ROHC compressor state during switching from a voice call to a video call in a UE, wherein the UE comprises an AP, a CP and a ROHC compressor and the method comprises sending an RTP header information of the voice call to the AP by the CP. Further, the method comprises providing the RTP header information to the ROHC compressor by the AP for retaining the ROHC compressor state during the video call.

Accordingly the disclosure provides a method for retaining a ROHC compressor state during switching from a video call to a voice call in a UE, wherein the UE comprises an AP, a CP and a ROHC compressor and the method comprises sending an RTP header information of the video call to the CP by the AP. Further, the method comprises providing the RTP header information to the ROHC compressor by the AP for retaining the ROHC compressor state during the voice call.

Accordingly the disclosure provides a UE for retaining a ROHC compressor state during switching from a voice call to a video call, wherein the UE comprises an AP, a CP and a ROHC compressor along with an integrated circuit. Further the integrated circuit comprises the AP, the CP and at least one memory. The memory comprises a computer program code within the integrated circuit. At least one memory and the computer program code with the AP and the CP cause the UE to send RTP header information of the voice call to the AP by the CP. The UE is further configured to provide the RTP header information to the ROHC compressor by the AP for retaining the ROHC compressor state during the video call.

Accordingly the disclosure provides a UE for retaining a ROHC compressor state during switching from a video call to a voice call, wherein the UE comprises an AP, a CP and a ROHC compressor along with an integrated circuit. Further the integrated circuit comprises the AP, the CP and at least one memory. The memory comprises a computer program code within the integrated circuit. At least one memory and the computer program code with the AP and the CP cause the UE to send RTP header information of the video call to the CP by the AP. The UE is further configured to provide the RTP header information to the ROHC compressor by the AP for retaining the ROHC compressor state during the voice call.

Accordingly the disclosure provides a computer program product comprising computer executable program code recorded on a computer readable non-transitory storage medium, the computer executable program code when executed, causing the actions including sending a RTP header information of the voice call to the AP by the CP. Further, the computer executable program code when executed, causing the actions including providing the RTP header information to the ROHC compressor by the AP for retaining the ROHC compressor state during the video call.

Accordingly the disclosure provides a computer program product comprising computer executable program code recorded on a computer readable non-transitory storage medium, the computer executable program code when executed, causing the actions including sending a RTP header information of the video call to the CP by the AP. Further, the computer executable program code when executed, causing the actions including providing the RTP header information to the ROHC compressor by the AP for retaining the ROHC compressor state during the voice call.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications are made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings in which like reference numerals represent like parts.

DETAILED DESCRIPTION

Figure 1:
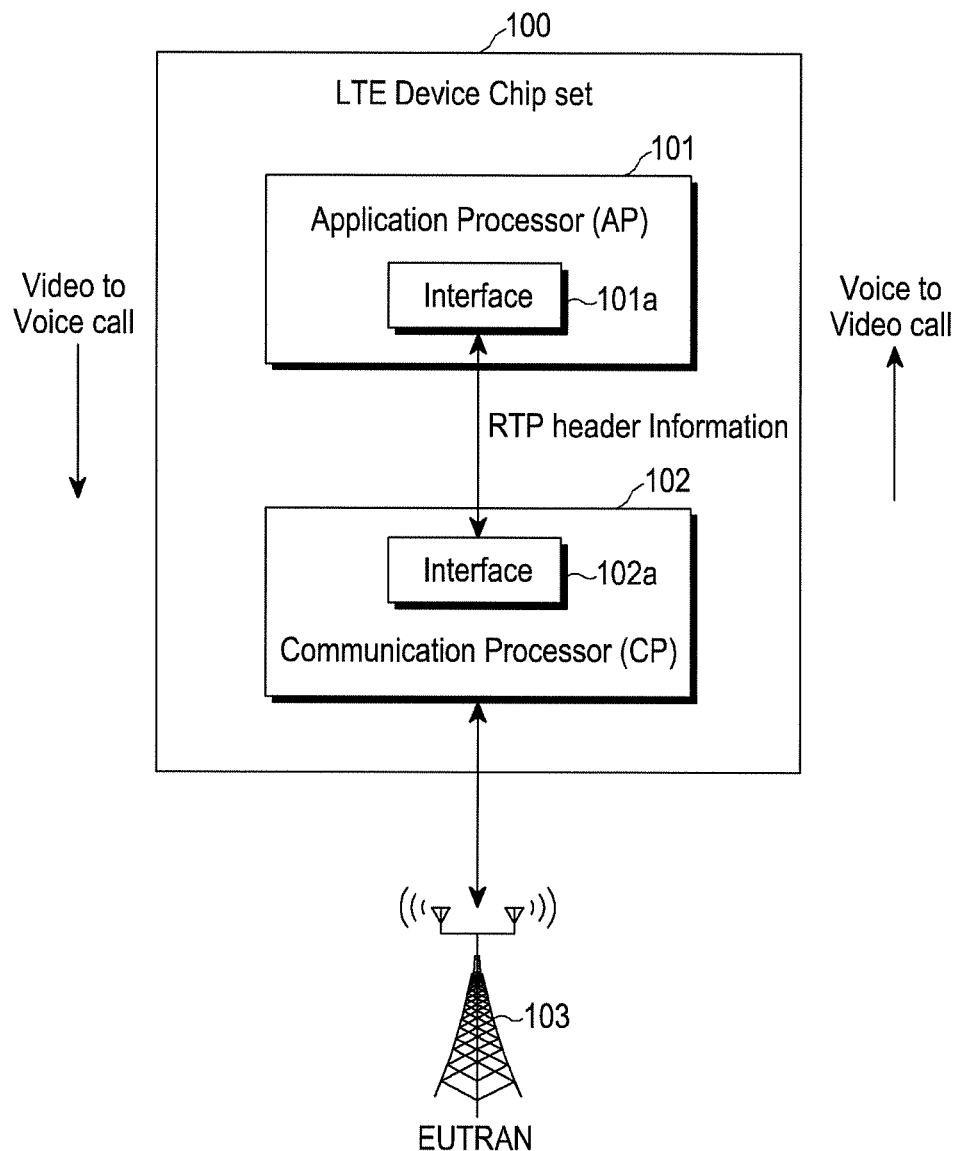
FIG. 1 illustrates a schematic diagram of a Long Term Evolution (LTE) chipset, according to embodiments as disclosed herein.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method for retaining a Robust Header Compression (ROHC) state in a User Equipment (UE) during switching from a Voice Over Long Term Evolution (VoLTE) call to a video call or vice versa.

When the VoLTE call is in progress and if a user switches the VoLTE call to the video call, then the RTP header information is sent to an Application Processor (AP) from a Communication Processor (CP), which is handling the VoLTE call, in the UE.

In certain embodiments, the RTP header information is sent to the AP from the CP through an interface, which facilitates inter-processor communication, between the AP and the CP.

Throughout the description, the terms VoLTE call and voice call are used interchangeably.

In certain embodiments, the RTP header information, which is sent to the AP from the CP, comprises recent RTP header of the VoLTE call. For example, user A is in voice call with user B. The voice call is handled by CP. When user switch to the video call during the voice call, the recent RTP header will be the last RTP packet sent to the ROHC by the CP. The CP sends the recent RTP header to the AP.

When the AP receives the recent RTP header from the CP, the AP sends the RTP data to a ROHC compressor in the UE. The ROHC compressor continues the compression of the RTP packets using the existing built context for the video call.

In a similar way, when the video call is in progress and if the user switches the video call to the VoLTE call, then the RTP header information is sent to the CP from the AP, which is handling the video call, in the UE.

In certain embodiments, the RTP header information is sent to the CP from the AP through an interface, which facilitates inter-processor communication, between the CP and the AP.

In certain embodiments, the RTP header information, which is sent to the CP from the AP, comprises recent RTP header of the video call. For example, user A is in video call with user B. The video call is handled by AP. When user switch to the voice call during the voice call, the recent RTP header will be the last RTP packet sent to the ROHC by the AP. The AP sends the recent RTP header to the CP.

When the CP receives the recent RTP header from the AP, the AP sends the RTP data to the ROHC compressor in the UE. The ROHC compressor continues the compression of the RTP packets using an existing built ROHC context for the VoLTE call. Hence, the ROHC context is reused by exchanging the RTP header information between AP and CP during switching from the VoLTE call to the video call or vice versa.

The disclosed method is robust, simple and effective for retaining the ROHC compressor state. Further, the method and system saves the bandwidth for performing ROHC, since the existing built context is reused for achieving efficient compression during switching from VoLTE call to video call or vice versa. Furthermore, the proposed method is readily implemented on the existing infrastructure and does not require extensive set-up or instrumentation to the existing infrastructure.

Referring now to the drawings and more particularly to FIGS. 1 through 8 where similar reference characters denote corresponding features consistently throughout the figures, there are shown preferred embodiments.

FIG. 1 illustrates a schematic diagram of a Long Term Evolution (LTE) chip set, according to embodiments as disclosed herein. The LTE device chip set 100 comprises an AP 101 for handling a video call and a CP 102, also known as a modem or a baseband processor, for handling network operations. In certain embodiments, the CP 102 handles a voice call between one or more devices. The CP 102 has limited functionality and lower power consumption than the AP 101. An interface 101a in the AP 101 and an interface 102a in the CP 102 facilitate inter-processor communication.

The relative processing power and power consumption of the AP 101, or of its cores, for example, a multicore processor, and the CP 102 varies substantially from chip set to chip set. The AP 101, for example, is a single core or multi-core, such as a dual core or quad core. The LTE chip set 100 includes at least one CP 102 suitable for several communications protocols or multiple simple communication processors each specializing in a particular communications protocol.

In certain embodiments, the CP 102 is configured to send the RTP header information to the AP 101 during switching from the VoLTE call to the video call through the interface 102a as shown in the FIG. 1. The RTP header information comprises recent RTP header of the VoLTE call.

In certain embodiments, the AP 101 is configured to send the RTP header information to the CP 102 during switching from the video call to the VoLTE call through the interface 101a as shown in the FIG. 1. The RTP header information comprises recent RTP header of the video call.

Figure 2:
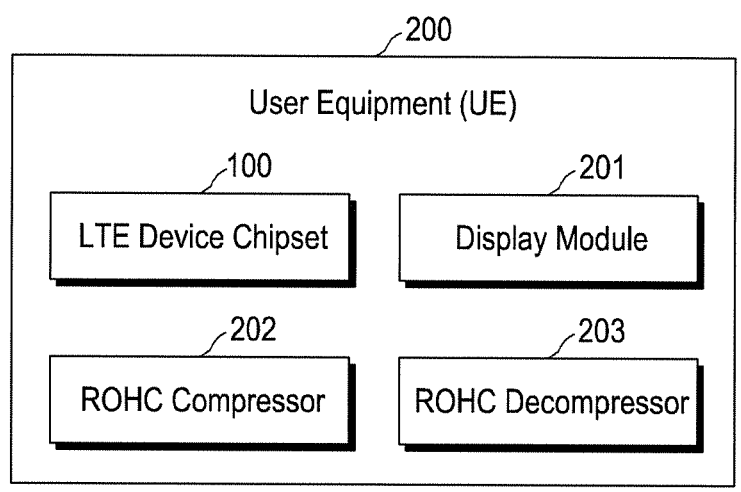
FIG. 2 illustrates a block diagram of a User Equipment (UE) with various modules, according to the embodiments as disclosed herein.

FIG. 2 illustrates a block diagram of a UE with various modules, according to the embodiments as disclosed herein. The UE 200 comprises the LTE device chip set 100, a display module 201, a ROHC compressor 202 and a ROHC decompressor 203. The LTE device chip set 100 comprises the AP 101 and the CP 102 as described in FIG. 1. The AP 101 and CP 102 are configured to exchange RTP header information during switching from the VoLTE call to the video call or vice versa. The display module 201 comprises a user interface, which is a key pad or through any other means by which a user inputs data into the UE 100. Further, the display module 201 is configured to provide the display during the video call, when the user switches the VoLTE call to the video call.

The ROHC compressor 202 is configured to perform the compression of IP/UDP and RTP headers during the UpLink (UL) data path and sends the compressed audio data to the EUTRAN 103.

In certain embodiments, the ROHC compressor 202 is configured to compress the IP/UDP headers from the values stored in a database of the ROHC compressor 202 during the UL data path.

Further, the ROHC compressor 202 is configured to send the ROHC compressed data along with the payload to a RAN through a L1 layer.

In certain embodiments, the ROHC compressor 202 establishes a context with the ROHC decompressor 203 and moves to a Full Context state during the compression of headers. In the Full Context state, the ROHC compressor 202 achieves the higher compression rate in which the ROHC compressor 202 works effectively in compressing the packets to a minimum of 4 bytes.

In certain embodiments, when the VoLTE call is switched to the video call, the ROHC compressor 202 is configured to receive the RTP header information, both static and dynamic fields, from the AP 101. Further, the ROHC compressor 202 is configured to retain the ROHC state during the video call using the RTP header information received from the AP 101.

In certain embodiments, when the video call is switched to the voice call, the ROHC compressor 202 is configured to receive the RTP header information, both static and dynamic fields, from the CP 102. Further, the ROHC compressor 202 is configured to retain the ROHC state during the voice call using the RTP header information received from the CP 102.

In the DownLink (DL) data path, the ROHC decompressor 203 is configured to receive the compressed ROHC packet from the RAN through the L1 Layer.

During the VoLTE call, the ROHC decompressor 203 is configured to construct the IP/UDP header after decoding the ROHC compressed packet during the DL data path. Further, the ROHC compressor 202 provides the RTP packets to an audio application in the UE 200 during the DL data path.

Figure 3:
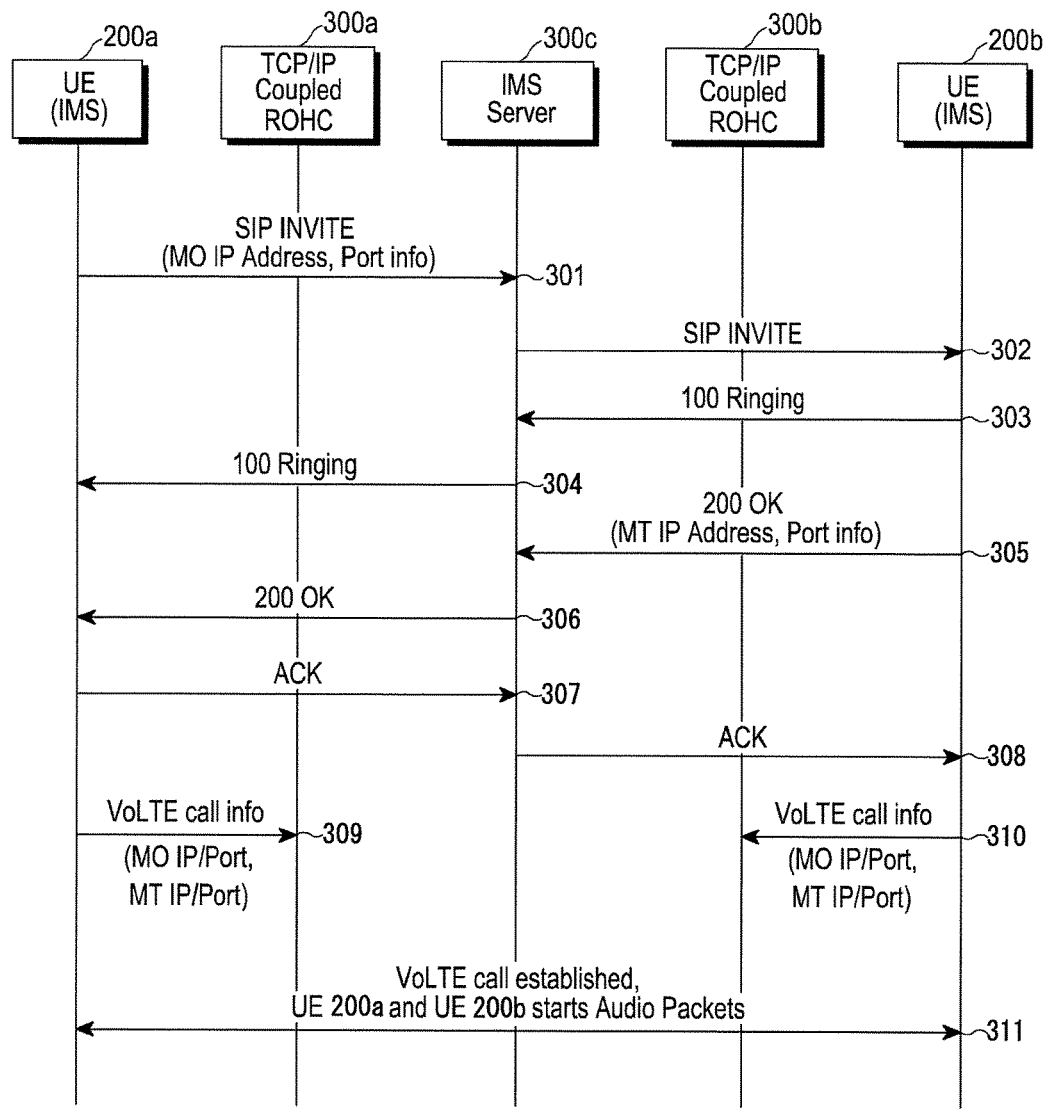
FIG. 3 illustrates a sequence diagram representing a Voice over LTE (VoLTE) call establishment procedure.

FIG. 3 illustrates a sequence diagram representing a VoLTE call establishment procedure, according to the embodiments as disclosed herein. The VoLTE call establishment procedure between a UE 200a and a UE 200b with IP Multimedia Subsystem (IMS) capability is depicted in the sequence diagram.

The UE 200a initiates the VoLTE call (Mobile originating (MO) call) with the UE 200b (Mobile Terminating (MT) call). Initially, the UE 200a sends (301) a Session Initiation Protocol (SIP) INVITE message with MO IP Address and Port information to an IMS server 300c.

Further, the IMS server 300c receives the SIP INVITE message from the UE 200a and forwards (302) the SIP INVITE message to the UE 200b. In response to the SIP INVITE MESSAGE from the IMS server 300c, the UE 200b sends (303) '100 Ringing' message to the IMS server 300c.

The IMS server 300c receives the '100 Ringing' message and forwards (304) to the UE 200a. Further, the UE 200b sends (305) "200 OK" message with MT IP Address and Port information to the IMS server 300c.

Further, the IMS server 300c forwards (306) the "200 OK" message to the UE 200a. The UE 200a sends (307) an ACK (acknowledge) message to the IMS server 300c and this ACK message is forwarded (308) to the UE 200b through the IMS server 300c.

Further, the UE 200a sends (309) the properties of VoLTE call, such as VoLTE call information, that comprises MO IP Address and Port, MT IP Address and Port to the TCP/IP coupled ROHC 300a.

Similarly, the UE 200b sends (310) the properties of VoLTE call, such as VoLTE call information, that comprises MO IP Address and Port, MT IP Address and Port to the TCP/IP coupled ROHC 300b. Once the UE 200a and the UE 200b share the IP Address and Port information with their corresponding TCP/IP coupled ROHCs, the VoLTE call is established between the UE 200a and the UE 200b. The UE 200a and UE 200b start (311) the exchange of audio packets when the VoLTE call is established.

Figure 4:
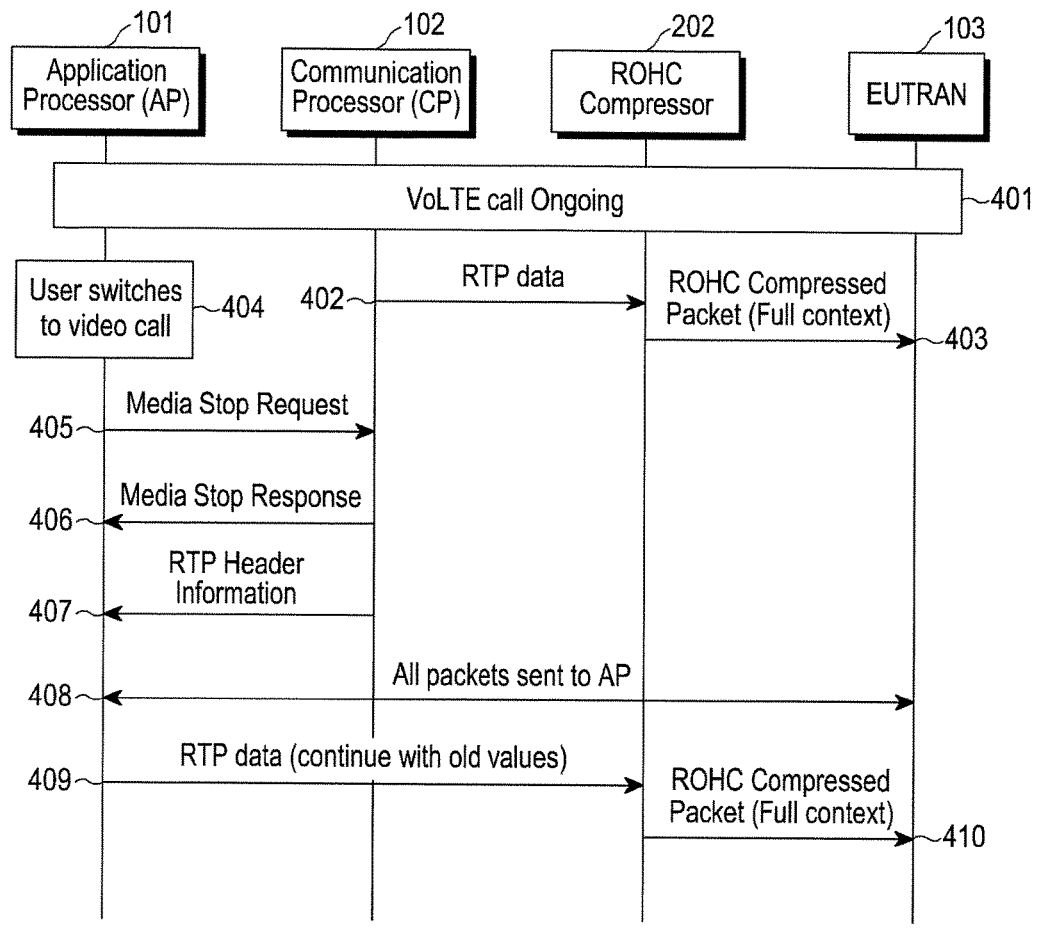
FIG. 4 illustrates a sequence diagram in which the RTP header information of the VoLTE call is sent to an Application Processor (AP) during switching from the VoLTE call to a video call, according to the embodiments as disclosed herein.

FIG. 4 illustrates a sequence diagram in which the RTP header information of the VoLTE call is sent to an AP 101 during switching from the VoLTE call to a video call, according to the embodiments as disclosed herein. As depicted in the sequence diagram, initially the VoLTE call is ongoing (401). During the VoLTE call, an audio application (not shown in the figure) in the CP 102 sends (402) RTP data to the ROHC compressor 202. The ROHC compressor 202 receives the RTP data from the audio application and applies the ROHC on the RTP data. Further, during the VoLTE call, the ROHC compressor 202 moves to a Full Context state in which the ROHC compressor 202 sends (403) a ROHC compressed packet, which is compressed to a minimum of size 4 bytes, to the EUTRAN 103. When the VoLTE call is ongoing and if the user switches (404) the VoLTE call to the video call, then an audio application (not shown in figure) in the AP 101 sends (405) a Media Stop Request to the audio application in the CP 102. In response to the Media Stop Request from the AP 101, the CP 102 sends (406) a Media Stop Response to the AP 101.

In certain embodiments, when the VoLTE call is switched to the video call, the CP 102 sends (407) the RTP header information to the AP. The RTP header information comprises static and dynamic fields of RTP header.

The AP 101 receives the RTP header information from the CP 102 and the video call is continued at the AP. In certain embodiments, during the video call, the packets of video data are sent (408) from the AP 101 to the EUTRAN 103 in the (UL) data path and the packets of video data are received at AP 101 from the EUTRAN in the DL data path.

In certain embodiments, the AP 101 sends (409) the RTP data to the ROHC compressor 202. The ROHC compressor 202 continues the compression for the video call with the context established during the VoLTE call. In certain embodiments, the ROHC compressor 202 is configured to continue the compression in full context state, which is achieved during the VoLTE call, and sends (410) the ROHC compressed packet to the EUTRAN 103.

Figure 5:
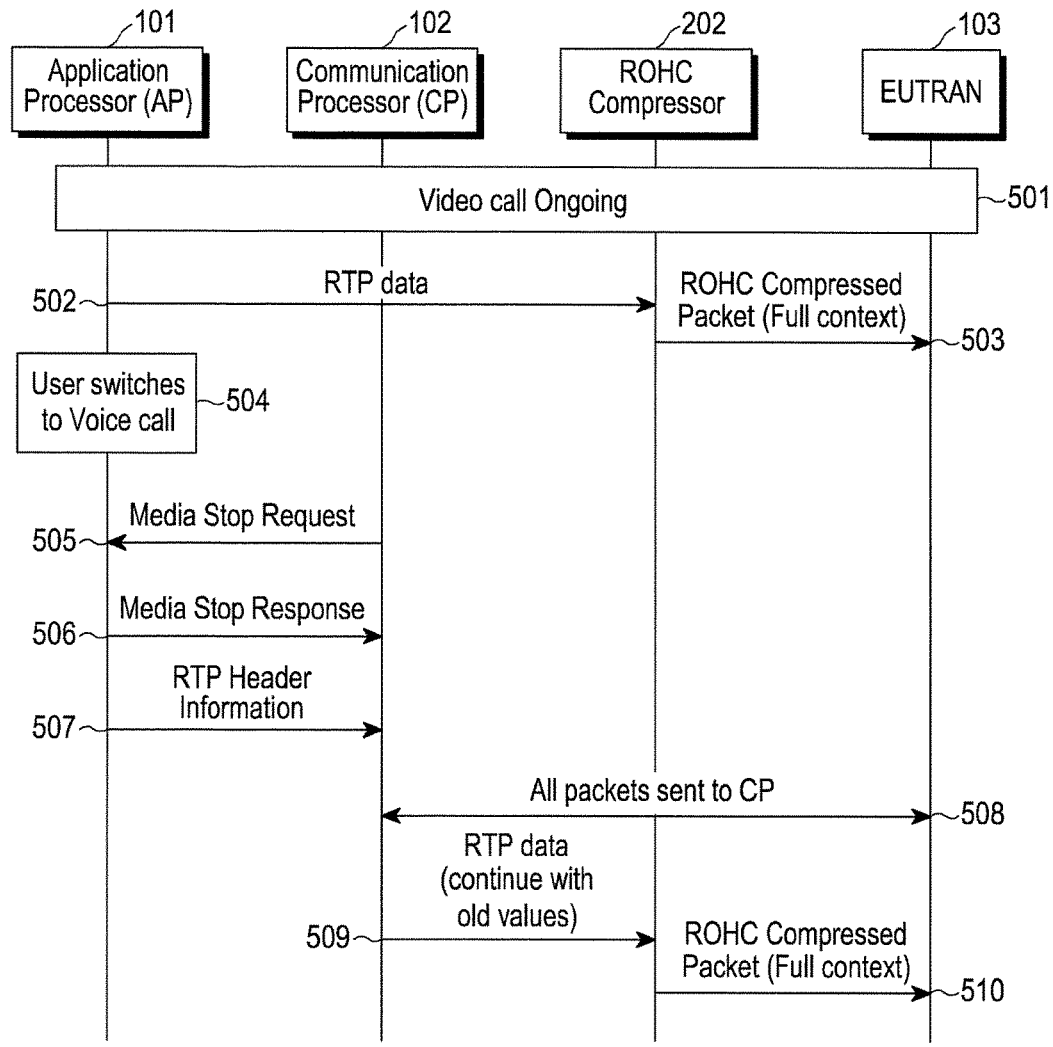
FIG. 5 illustrates a sequence diagram in which the RTP header information of the video call is sent to a Communication Processor (CP) during switching from the video call to the VoLTE call, according to the embodiments as disclosed herein.

FIG. 5 illustrates a sequence diagram in which the RTP header information of the video call is sent to a CP during switching from the video call to the VoLTE call, according to the embodiments as disclosed herein. As depicted in the sequence diagram, initially the video call is ongoing (501). During the video call, an audio application (not shown in the figure) in the AP 101 sends (502) RTP data to the ROHC compressor 202. The ROHC compressor 202 receives the RTP data from the audio application in the AP 101 and applies the ROHC on the RTP data. Further, during the video call, the ROHC compressor 202 moves to a full context state in which the ROHC compressor 202 sends (503) a ROHC compressed packet, which is compressed to a minimum of size 4 bytes, to the EUTRAN 103. When the video call is ongoing and if the user switches (504) the video call to a VoLTE call, then the audio application 101b in the CP 102 sends (505) a Media Stop Request to the audio application 102b in the AP 101. In response to the Media Stop Request from the CP 102, the audio application in the AP 101 sends (506) a Media Stop Response to the audio application in the CP 102.

In certain embodiments, when the video call is switched to the VoLTE call, the AP 101 sends (507) RTP header information to the CP 102. The RTP header information comprises static and dynamic fields of RTP header.

The CP 102 receives the RTP header information from the AP and the VoLTE call is continued at the CP. In certain embodiments, during the VoLTE, the packets of VoLTE call are sent (508) from the CP 102 to the EUTRAN 103 in the (UL) data path and the packets of VoLTE call are received at CP from the EUTRAN 103 in the (DL) data path.

In certain embodiments, the CP 102 sends (509) the RTP data to the ROHC compressor 202. The ROHC compressor 202 continues the compression for the VoLTE call with the context established during the video call. In certain embodiments, the ROHC compressor 202 continues the compression in the Full Context state, which is achieved during the video call, and sends (510) the ROHC compressed packet to the EUTRAN 103.

Figure 6:
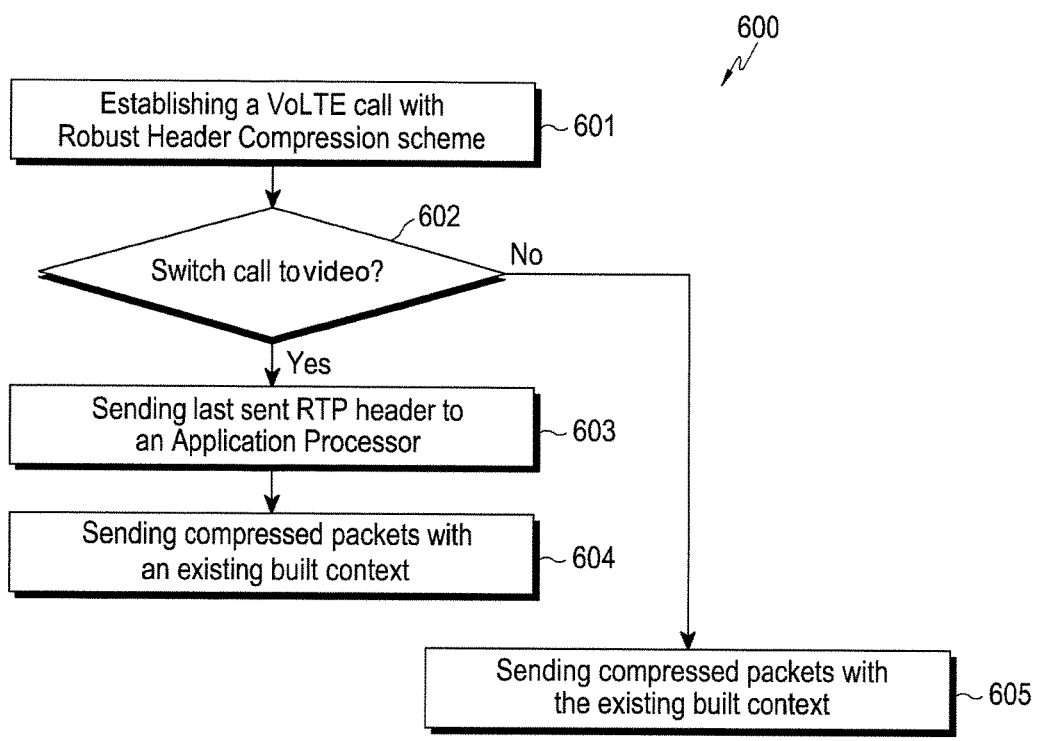
FIG. 6 illustrates a method for sending the RTP header information from the CP to AP during switching from the VoLTE call to the video call, according to the embodiments as disclosed herein.

FIG. 6 illustrates a method 600 for sending the RTP header information from the CP to AP during switching from the VoLTE call to the video call, according to the embodiments as disclosed herein. At step 601, the method 600 includes establishing the VoLTE call with the ROHC scheme. In certain embodiments, the UE 200 establishes the VoLTE call with the ROHC scheme. At step 602, the method 600 includes determining whether the user has switched the VoLTE call to the video call. In certain embodiments, the UE 200 determines whether the user has switched the VoLTE call to the video call. If at step 602, it is determined that the user has switched the VoLTE call to the video call, then at step 603, the method 600 includes sending recent (last sent) RTP header to the AP 101. The method 600 allows the CP 102 to send the recent RTP header to the AP 101. In certain embodiments, the method 600 allows the CP 102 to send the last sent RTP header through the interface 102a in the CP 102 to the interface 101a in the AP 101 (as shown in FIG. 1). At step 604, the method 600 includes sending compressed packets to the EUTRAN 103 with an existing built context. The method 600 allows the ROHC compressor 202 to send the ROHC compressed packets with the existing built context, which is established during the VoLTE call.

If at step 602, it is determined that the user has not switched the VoLTE call to the video call, then at step 605, the method 600 includes sending compressed packets with the existing built context. The method 600 allows the ROHC compressor 202 to send the ROHC compressed packets with the existing built context.

Further, the various actions, units, steps, blocks, or acts described in the method 600 are performed in the order presented, in a different order, simultaneously, or a combination thereof. Furthermore, in some embodiments, some of the actions, units, steps, blocks, or acts listed in the FIG. 6 can be omitted.

Figure 7:
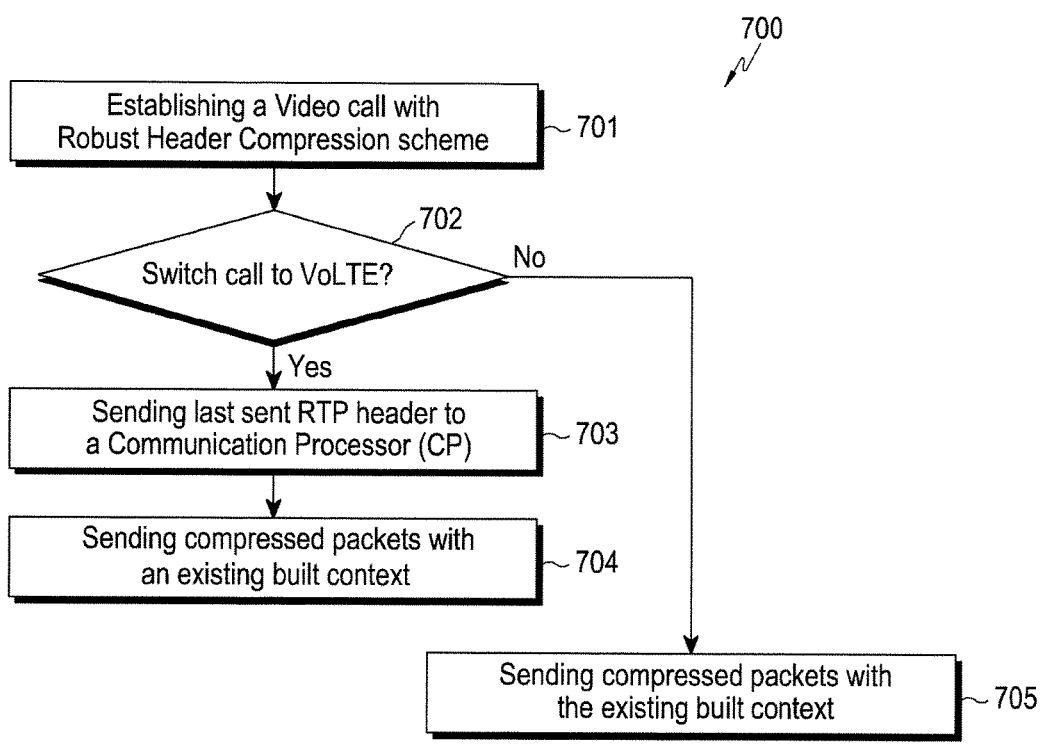
FIG. 7 illustrates a method for sending the RTP header information from the AP to the CP during switching from the video call to the VoLTE call, according to the embodiments as disclosed herein.

FIG. 7 illustrates a method 700 for sending the RTP header information from the AP to the CP during switching from the video call to the VoLTE call, according to the embodiments as disclosed herein. At step 701, the method 700 includes establishing the video call with the ROHC scheme. The method 700 allows the UE 200 to establish the VoLTE call with the ROHC scheme. At step 702, the method 700 includes determining whether the user has switched the video call to the VoLTE call. The method 700 allows the UE 200 to determine whether the user has switched the video call to the VoLTE call. If at step 702, it is determined that the user has switched the video call to the VoLTE call, then at step 703, the method 700 includes sending recent (last sent) RTP header to the CP 102. The method 700 allows the AP 101 to send the last sent RTP header to the AP 101. In certain embodiments, the method 700 allows the CP 102 to send the last sent RTP header through the interface 102a in the CP 102 to the interface 101a in the AP 101 (as shown in FIG. 1). At step 704, the method 700 includes sending compressed packets to the EUTRAN 103 with an existing built context, which is established during the video call. The method 700 allows the ROHC compressor 202 to send the ROHC compressed packets with the existing built context.

If at step 702, it is determined that the user has not switched the VoLTE call to the video call, then at step 705, the method 700 includes sending compressed packets with the existing built context. The method 700 allows the ROHC compressor 202 to send the ROHC compressed packets with the existing built context.

Further, the various actions, units, steps, blocks, or acts described in the method 700 are performed in the order presented, in a different order, simultaneously, or a combination thereof. Furthermore, in some embodiments, some of the actions, units, steps, blocks, or acts listed in the FIG. 7 can be omitted.

Figure 8:
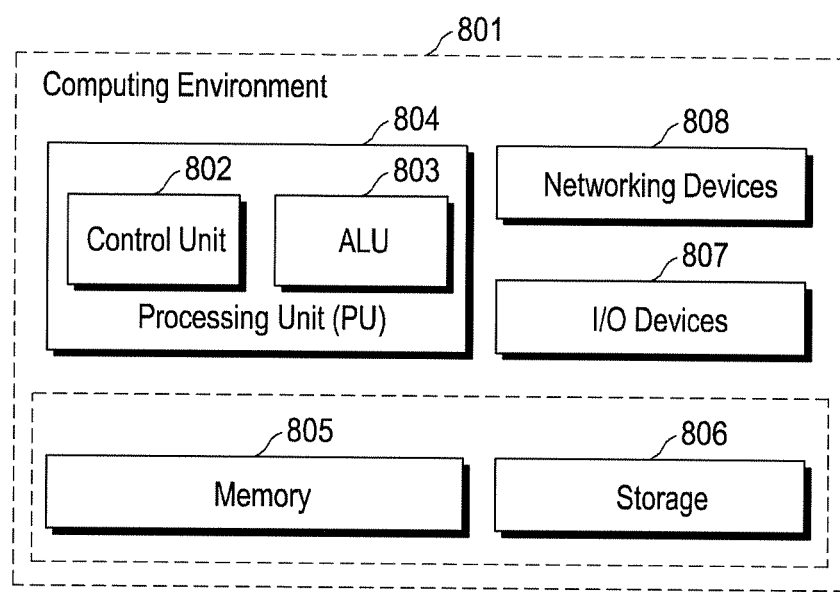
FIG. 8 illustrates a computing environment implementing the method and device for retaining a Robust Header Compression (ROHC) compressor state during switching from the VoLTE to the video call or vice versa according to the embodiments as disclosed herein.

FIG. 8 illustrates a computing environment implementing the method and device for retaining a ROHC compressor state during switching from a voice call to a video call or vice versa, according to the embodiments as disclosed herein. As depicted the computing environment 801 comprises at least one processing unit 804 that is equipped with a control unit 802 and an Arithmetic Logic Unit (ALU) 803, a memory 805, a storage unit 806, plurality of networking devices 808 and a plurality of input/output (I/O) devices 807. The processing unit 804 is responsible for processing the instructions of the algorithm. The processing unit 804 receives commands from the control unit 802 in order to perform its processing. Further, any logical and arithmetic operations involved in the execution of the instructions are computed with the help of the ALU 803.

The overall computing environment 801 is composed of multiple homogeneous or heterogeneous cores, multiple CPUs of different kinds, special media and other accelerators. The processing unit 804 is responsible for processing the instructions of the algorithm. Further, the plurality of processing units 804 is located on a single chip or over multiple chips.

The algorithm comprising of instructions and codes required for the implementation are stored in either the memory 805 or the storage unit 806 or both. At the time of execution, the instructions are fetched from the corresponding memory 805 or storage unit 806, and executed by the processing unit 804.

In certain embodiments of any hardware implementations, various networking devices 808 or external I/O devices 807 are connected to the computing environment to support the implementation through the networking device 808 and the I/O device 807.

The embodiments disclosed herein are implemented through at least one software program running on at least one hardware device and performing network management functions to control the elements. The elements shown in FIGS. 1, 2, 3, 4, 5 and 8 include blocks, which are at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for retaining a robust header compression (ROHC) compressor state during switching from a voice call to a video call in a user equipment (UE), wherein the UE comprises an application processor (AP), a communication processor (CP) and a ROHC compressor and the method comprises:
    establishing the voice call with another UE;
    in response to detecting that the voice call is switched to the video call, sending, by the CP, a real time transport protocol (RTP) header information of the voice call to the AP, during switching from the voice call to the video call;
    providing, by the AP, the RTP header information received from the CP, to the ROHC compressor; and
    retaining a state of the ROHC compressor on the video call to be identical to a state of the ROHC compressor on the voice call based on the RTP header information.

2. The method as in claim 1, wherein the RTP header information comprises a recent RTP header of the voice call, wherein the RTP header information is sent to the AP through an interface of the UE between the CP and the AP.

3. The method as in claim 1, wherein the method further comprises:
    retaining, by the ROHC compressor, a ROHC context established during the voice call using the RTP header information for the video call.

4. A method for retaining a robust header compression (ROHC) compressor state during switching from a video call to a voice call in a user equipment (UE), wherein the UE comprises an application processor (AP), a communication processor (CP) and a ROHC compressor and the method comprises:
    establishing the video call with another UE;
    in response to detecting that the voice call is switched to the video call, sending, by the AP, a real time transport protocol (RTP) header information of the video call to the CP, during switching from the voice call to the video call;
    providing, by the CP, the RTP header information received from the AP, to the ROHC compressor; and
    retaining a state of the ROHC compressor on the video call to be identical to a state of the ROHC compressor on the voice call based on the RTP header information.

5. The method as in claim 4, wherein the RTP header information comprises a recent RTP header of the video call, wherein the RTP header information is sent to the CP through an interface of the UE between the AP and the CP.

6. The method as in claim 4, wherein the method further comprises:
    retaining, by the ROHC compressor, a ROHC context established during the video call using the RTP header information for the voice call.

7. A user equipment (UE) for retaining a robust header compression (ROHC) compressor state during switching from a voice call to a video call, wherein the UE comprises:
    an application processor (AP);
    a communication processor (CP) configured to establish the voice call with another UE; and
    a ROHC compressor;
    wherein the CP is further configured to send a real time transport protocol (RTP) header information of the voice call to the AP in response to detecting that the voice call is switched to the video call, during switching from the voice call to the video call,
    wherein the AP is further configured to provide the RTP header information received from the CP, to the ROHC compressor, and
    wherein a state of the ROHC compressor on the video call is retained identically to a state of the ROHC compressor on the voice call based on the RTP header information.

8. The UE as in claim 7, wherein the RTP header information comprises a recent RTP header of the voice call, wherein the RTP header information is sent to the AP through an interface of the UE between the CP and the AP.

9. The UE as in claim 7, wherein the ROHC compressor is configured to retain a ROHC context established during the voice call using the RTP header information for the video call.

10. A user equipment (UE) for retaining a robust header compression (ROHC) compressor state during switching from a video call to a voice call, wherein the UE comprises:
    an application processor (AP) configured to establish the video call with another UE;
    a communication processor (CP); and
    a ROHC compressor;
    wherein the AP is further configured to send a real time transport protocol (RTP) header information of the video call to the CP, when the video call is switched to the voice call during switching from the voice call to the video call,
    wherein the CP is further configured to provide the RTP header information received from the AP, to the ROHC compressor, and
    wherein a state of the ROHC compressor on the video call is retained identical to a state of the ROHC compressor on the voice call based on the RTP header information.

11. The UE as in claim 10, wherein the RTP header information comprises a recent RTP header of the video call, wherein the RTP header information is sent to the CP through an interface of the UE between the AP and the CP.

12. The UE as in claim 10, wherein the ROHC compressor is configured to retain a ROHC context established during the video call using the RTP header information for the voice call.

13. A computer program product comprising computer executable program code recorded on a computer readable non-transitory storage medium, the computer executable program code when executed, causes a processor to perform the steps of:
    establishing a voice call with another user equipment (UE);
    in response to detecting that the voice call is switched to a video call, sending, by a communication processor (CP) of a UE, a real time transport protocol (RTP) header information of the voice call to an application processor (AP) of the UE during switching from the voice call to the video call;
    providing, by the AP, the RTP header information received from the CP, to a robust header compression (ROHC) compressor of the UE; and
    retaining a state of the ROHC compressor on the video call to be identical to a state of the ROHC compressor on the voice call based on the RTP header information.

14. The computer program product as in claim 13, wherein the RTP header information comprises a recent RTP header of the voice call, wherein the RTP header information is sent to the AP through an interface of the UE between the CP and the AP.

15. The computer program product as in claim 13, wherein the computer executable program code when executed, further causes the processor to perform the steps of: retaining, by the ROHC compressor, a ROHC context established during the voice call using the RTP header information for the video call.

16. A computer program product comprising computer executable program code recorded on a computer readable non-transitory storage medium, the computer executable program code when executed, causes a processor to perform the steps of:

establishing a video call with another user equipment (UE);

in response to detecting that a voice call is switched to the video call, sending, by an application processor (AP) of the UE, a real time transport protocol (RTP) header information of the video call to a communication processor (CP) of the UE, during switching from the voice call to the video call;

providing, by the CP, the RTP header information received from the AP, to a robust header compression (ROHC) compressor of the UE; and retaining a state of the ROHC compressor on the video call to be identical to a state of the ROHC compressor on the voice call based on the RTP header information.

17. The computer program product as in claim 16, wherein the RTP header information comprises a recent RTP header of the video call, wherein the RTP header information is sent to the CP through an interface of the UE between the AP and the CP.

18. The computer program product as in claim 16, wherein the computer executable program code when executed, further causes the processor to perform the steps of: retaining, by the ROHC compressor, a ROHC context established during the voice call using the RTP header information for the video call.

* * * * *